United States Patent Office 2,876,416
Patented Mar. 3, 1959

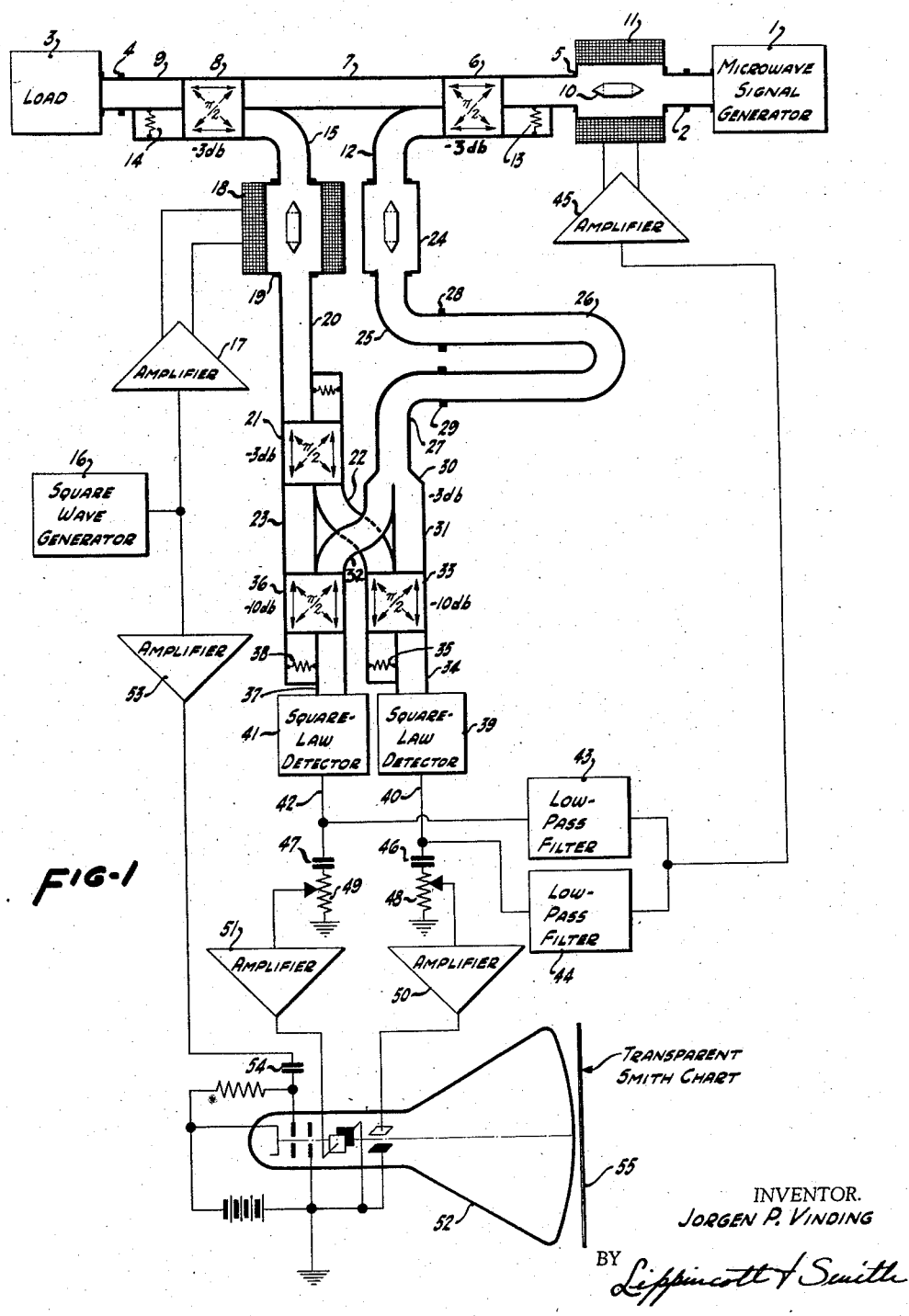

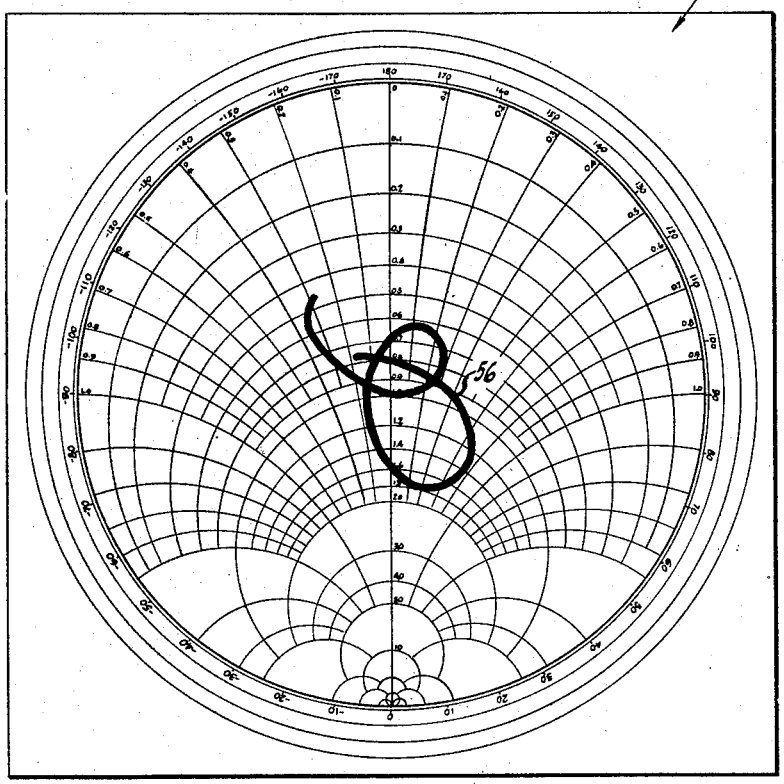

2,876,416

MICROWAVE IMPEDANCE PLOTTER

Jorgen P. Vinding, Los Gatos, Calif., assignor, by mesne assignments, to Monogram Precision Industries, Inc., Culver City, Calif., a corporation of California Application June 11, 1956, Serial No. 590,467

17 Claims. (Cl. 324—58)

This invention relates to improved apparatus for automatically and continuously measuring and displaying values of the reflection coefficient and the impedance of a microwave load device.

When electromagnetic microwaves are supplied to a load device, through a waveguide for example, any difference between the impedance of the load and the image impedance of the waveguide causes the load to reflect some of the microwaves. This phenomenon is the basis for many prior techniques for making impedance measurements. One such technique, for example, employs a movable probe in a slotted waveguide for measuring the standing-wave pattern set up in the waveguide by interaction between forward-traveling microwaves and backward-traveling reflected microwaves. Since the impedance of microwave devices is generally a complex function of frequency, impedance measurements over a considerable band of frequencies are often required. The making of such measurements by techniques heretofore commonly employed is a laborious and time-consuming point-by-point operation. Accordingly, an object of this invention is to provide improved apparatus for automatically and continuously measuring and displaying impedance values of a microwave load device.

The need for an automatic impedance plotter has been recognized for many years, and various impedance plotters have heretofore been proposed. However, for microwave applications such prior apparatus has suffered from one or more of several practical disadvantages, such as practical utility only at relatively low frequencies or over relatively narrow frequency bands, or both, complexity of apparatus, slow operating speed, substantial measurement errors, stringent circuit stability requirements, and the like. Accordingly, another object of this invention is to provide an improved impedance plotter without the aforesaid disadvantages, and in particular to provide an improved impedance plotter that can be used at high microwave frequencies and over wide frequency bands, that is fast in operation, and that employs simple apparatus easily used by relatively unskilled personnel for making accurate impedance measurements quickly and without critical adjustments.

The reflection coefficient of a microwave load is defined as the vector ratio of the incident microwave voltage to the reflected microwave voltage. It is often represented mathematically by the complex number $$R \cos \theta + jR \sin \theta$$

where R is the amplitude ratio of the reflected microwave voltage to the incident microwave voltage, $\theta$ is the phase angle between the reflected microwave voltage and the incident microwave voltage, and $j$ is a mathematical operator numerically equal to $\sqrt{-1}$ that represents a vector rotation of $\pi/2$ radians or 90 degrees. If the reflection coefficient is known, the resistive and reactive components of load impedance can easily be determined, or vice versa, by means of a conventional Smith chart, as is well kown to those skilled in the art.

Briefly stated, in accordance with certain aspects of this invention whereby the foregoing and other objects and advantages are achieved, microwaves are transmitted to the load by suitable transmission means such as a waveguide. Directional coupling means connected to the aforesaid transmission means provide a first microwave signal proportional to the microwaves transmitted to the load and a second microwave signal proportional to the microwaves reflected from the load. The aforesaid first signal is delayed by an appropriate amount, as hereinafter explained, and is then divided into first and second portions. The aforesaid second signal is amplitude modulated, preferably with a rectangular waveform modulation envelope, and is then divided into first and second portions.

The microwave circuit includes phase shifting means such that the phase relation between the aforesaid two first portions differs from the phase relation between the aforesaid two second portions by 90 degrees. This phase shifting may conveniently be performed by using a directional coupler or hybrid junction providing a differential phase shift of $\pi/2$ radians or 90 degrees for dividing one of the microwave signals into two portions, and using a T-junction providing zero differential phase shift for dividing the other microwave signal into two portions. The transmittance of the microwave circuit for said first signal is substantially greater than the transmittance of the microwave circuit for said second signal, so that the two portions of the divided first signal have substantially larger amplitudes than the two portions of the divided second signal.

The aforesaid two first portions, or parts thereof, are added together to provide a first sum signal, and the aforesaid two second portions, or parts thereof, are added together to provide a second sum signal. The two sum signals are individually rectified or detected by two detectors to provide two rectified signals each having a D. C. component and an A. C. component.

The D. C. components of the detected signals are each related in magnitude to the amplitude of the microwaves transmitted to the load, and these D. C. components operate an automatic-gain-control circuit for maintaining this amplitude substantially constant. The A. C. components of the two detected signals, or parts thereof, are supplied to the horizontal and vertical deflection circuits of a cathode-ray tube for providing a luminous spot on the phosphor screen of the cathode-ray tube at a position that corresponds to the reflection coefficient of the load device.

A transparent Smith chart or the like is placed over the face of the cathode-ray tube so that the luminous spot indicates on the Smith chart values proportional to the resistive and reactive components of the load impedance. When the microwave frequency is varied over a frequency range, the luminous spot traces a path that represents on the Smith chart the complex impedance of the load device throughout the frequency range. This pattern can be observed directly, or it can be photographed for future reference.

The invention will be better understood from the following detailed description of an illustrative embodiment taken in connection with the accompanying drawings, and its scope will be pointed out in the appended claims. In the drawings, Fig. 1 is a schematic diagram of apparatus embodying principles of this invention, and Fig. 2 shows a Smith chart used in the Fig. 1 apparatus, somewhat simplified for clarity in the drawing, with the locus of typical impedance values displayed thereon.

Referring now to Fig. 1 of the drawings, a microwave signal generator 1 may be a backward-wave oscillator or any other device for supplying microwaves of the desired frequency. Preferably, signal generator 1 is tunable over a range of frequencies so that impedance values throughout a frequency range can be plotted. However, if measurements at only a single frequency are desired, the signal generator may be of a fixed-frequency type. A flanged waveguide connection 2 is provided between the signal generator and the remainder of the apparatus so that different signal generators may be substituted if desired.

Load 3 represents the microwave device that is to be tested. The load, which may be any device having a microwave impedance that is to be measured, is connected to the impedance plotter by means of a flanged waveguide connection 4. Microwaves are transmitted from signal generator 1 to load 3 through a microwave transmission circuit consisting of a variable attenuator 5, a directional coupler 6, a waveguide section 7, another directional coupler 8, and another waveguide section 9.

The variable attenuator 5 is a commercially available device utilizing the Faraday rotation produced by a magnetized ferrite. Attenuator 5 consists essentially of a circular waveguide section between two alined rectangular waveguide sections, a ferrite element 10 within the circular section, and a winding 11 surrounding the circular section. Absorber cards (not shown) may be disposed near the ends of the rectangular waveguide sections for attenuating wave components having polarizations other than the polarization of waves transmitted by the rectangular waveguides. When there is no current in winding 11, electromagnetic waves are transmitted between the two aligned rectangular waveguide sections substantially without rotation of their plane of polarization and with minimum attenuation.

When a certain amount of current is supplied to winding 11, ferrite element 10 is magnetized sufficiently that electromagnetic waves passing through the circular waveguide section are rotated by substantially 90 degrees. Consequently, electromagnetic waves arrive at the attenuator output rectangular waveguide section with a polarization that is not transmitted by the rectangular waveguide but is attenuated by the absorber cards, so that the two rectangular waveguide sections are effectively decoupled from each other and maximum attenuation of the transmitted wave is provided.

Alternatively, by rotating one rectangular waveguide section by 90 degrees relative to the other, the attenuator can be made to provide maximum attenuation when the current in winding 11 is zero and minimum attenuation when the current is maximum. Other types of rapidly-variable microwave attenuators may also be used.

When intermediate amounts of current are supplied to winding 11, the microwaves are rotated by less than 90 degrees and the transmitted microwaves are attenuated by intermediate amounts. The current supplied to winding 11 is controlled in a manner hereinafter explained so that microwaves of substantially constant amplitude are supplied to directional coupler 6 despite amplitude variations that may occur in the output of signal generator 1 when the frequency of the signal generator is varied.

Directional coupler 6 is a conventional device, such as a multi-hole directional coupler or a short-slot hybrid junction, having four waveguide connections or circuit arms arranged in pairs, two on each side of the directional coupler. Microwave supplied to any one of the four circuit arms of the directional coupler are divided into two portions in phase quadrature that are transmitted through the coupler to respective ones of the two circuit arms on the other side of the directional coupler.

One circuit arm of directional coupler 6 is connected to the output side of variable attenuator 5 so that microwaves transmitted from signal generator 1 through the variable attenuator 5 are divided into two portions by directional coupler 6, one of which portions is transmitted to waveguide section 7 and the other of which portions is transmitted to a waveguide section 12. Preferably, for measurements at low power levels, the coupling coefficient of the directional coupler is such that these two portions are substantially equal, each about 3 db (one-half the power) smaller than the signal supplied to the directional coupler. At higher power levels, directional couplers having coefficients other than 3 db may be preferable. Such directional couplers provide differential phase shift of $\pi/2$ radians, so that the signal transmitted to waveguide section 12 is advanced in phase by 90 degrees relative to the signal transmitted to waveguide section 7. The fourth arm of the directional coupler is connected to an attenuator 13 that absorbs any microwaves transmitted to the fourth arm and thus avoids undesirable reflections.

The microwave signal transmitted in the forward (right-to-left) direction through waveguide section 7 is divided into two equal portions by a directional coupler 8, which may be identical to directional coupler 6. One of these portions is absorbed by attenuator 14, and the other is transmitted through waveguide section 9 to load device 3. Since there is a loss of about 3 db (a power loss of one-half) in the signal transmitted straight through each directional coupler (the other half of the microwave power being transmitted diagonally through the directional coupler), the amount of microwave power supplied to load 3 is approximately one-fourth of the microwave power supplied to directional coupler 6 through variable attenuator 5 by signal generator 1.

Unless the impedance of load 3 is identical to the image impedance of waveguide section 9, some of the microwave energy is reflected at load 3 and is transmitted in the reverse (left-to-right) direction through waveguide section 9. These reflected microwaves are divided into two substantially equal portions by directional coupler 8, of which one portion is transmitted in a backward direction through waveguide section 7 and the other portion is supplied to a waveguide section 15.

The portion of the reflected signal transmitted in the backward direction through waveguide section 7 is partly absorbed in attenuator 13 and partly returned to variable attenuator 5. It is of no consequence in the operation of the impedance plotter herein described. What is significant is that the microwave signal supplied to waveguide section 12 is proportional to the microwaves transmitted to load 3, and the microwave signal supplied to waveguide section 15 is proportional to the microwaves reflected by the load. Therefore, the vector ratio of the two microwave signals supplied to waveguide sections 12 and 15, respectively, is related to (but not identically equal to) the reflection coefficient of load 3.

A square wave generator 16 and amplifier 17 supply rectangular waveform current pulses through the winding 18 of a variable attenuator 19, which may be identical in principle to variable attenuator 5. In practice, the design of the two variable attenuators may be slightly different, in that attenuator 5 preferably is designed with emphasis on sensitivity while attenuator 19 is designed with emphasis on frequency response. Variable attenuator 19 has its input connected to waveguide section 15 and its output connected to a waveguide section 20, so that the microwave signal supplied to waveguide section 15, in the manner hereinbefore explained, is amplitude-modulated with a substantially rectangular waveform modulation envelope and is then transmitted through waveguide section 20. The modulation frequency is not critical, but a convenient fundamental frequency of modulation is in the order of ten kilocycles per second. The modulation index preferably is near unity. That is, there is little attenuation in variable attenuator 19 when there is no current through the winding 18, and very little of the microwave signal is transmitted by attenuator 19 during the current pulses supplied to winding 18, or vice versa.

The amplitude-modulated microwave signal transmitted through waveguide section 20 is divided into two substantially equal portions by a directional coupler 21, which may be identical to directional couplers 6 and 8. A first of these two portions is supplied to a waveguide section 22, and a second of these two portions is supplied to a waveguide section 23. Because of the $\pi/2$ radians or 90 degree differential phase shift produced by the directional coupler, the two signals supplied to waveguide sections 22 and 23 are in phase quadrature.

A circuit element 24, identical to variable attenuator 19 but without the winding 18, preferably is connected to waveguide section 12 so that the transmittance versus frequency characteristics of the two circuit branches will be identical. However, since there is no magnetization of the ferrite in circuit element 24, the attenuation produced by this circuit element, which may be called a dummy attenuator, has a constant minimum value.

The output of circuit element 24 is connected to waveguide sections 25, 26 and 27 in series, as shown. Waveguide section 26 is connected to waveguide sections 25 and 27 at flanged waveguide connections 28 and 29, so that section 26 may be replaced by similar sections of different lengths when desired. Waveguide section 26 provides a time delay in microwave signals transmitted thereby for purposes hereinafter explained. Alternatively, a continuously adjustable delay section or "line stretcher" can be provided in place of or in addition to waveguide section 26.

The microwave signal transmitted by waveguide section 27 is divided into two substantially equal parts by a T junction 30, which may be a well-matched folded T waveguide junction. A first of these two signal portions is supplied to a waveguide section 31, and a second of these two signal portions is supplied to a waveguide section 32. These two signal portions are in phase with each other, since the T junction does not produce a differential phase shift.

Portions of the two microwave signals transmitted by waveguide sections 22 and 31 are combined in a directional coupler 33 to provide a microwave sum signal in a waveguide section 34. The remaining portions of these two microwave signals are dissipated in an attenuator 35. Preferably, the coupling coefficient of directional coupler 33 is such that microwaves are transmitted straight through the directional coupler with very little attenuation, while microwaves are transmitted diagonally through the directional coupler with an attenuation of about 10 db. Consequently, a relatively small portion of the microwave signal transmitted by waveguide section 22 is transmitted to waveguide section 34, while the major portion of the signal transmitted by waveguide section 31 is transmitted to waveguide section 34.

In a similar manner, a directional coupler 36, which may be identical to coupler 33, transmits a major portion of the microwave signal from waveguide section 32 to a waveguide section 37, and transmits a relatively small portion of the microwave signal from waveguide section 23 to waveguide section 37 to provide another sum signal in waveguide section 37. Other portions of the microwave signals transmitted by waveguide sections 23 and 32 are dissipated in an attenuator 38.

The microwave sum signal transmitted through waveguide section 34 is rectified by a detector 39, which may be a conventional "square-law" crystal rectifier that supplies to line 40 a rectified voltage proportional to the square of the instantaneous amplitude of the modulation envelope of the microwave signal in waveguide section 34. Similarly, the microwave sum signal transmitted through waveguide section 37 is rectified by a square-law detector 41 that supplies a rectified signal to line 42.

Microwave detector diodes usually have a nearly square-law characteristic (current proportional to the square of voltage) within their rated operating range. Although desirable, a square-law detector characteristic is not essential to the present invention, and in fact the detector characteristic is not very critical. For example, detectors having linear or exponential characteristics may be used successfully.

Each of the two rectified signals contains a D. C. component and a rectangular-waveform modulation-frequency A. C. component. Assuming a square-law detector characteristic, the D. C. components are substantially proportional to the square of the amplitude of the microwave signal supplied to directional coupler 6 through variable attenuator 5 by signal generator 1. These D. C. components are transmitted through low pass filters 43 and 44, which do not transmit substantial amounts of the modulation-frequency components, and are supplied to an amplifier 45 that provides current through winding 11 of variable attenuator 5 for automatically adjusting the attenuation factor of the variable attenuator to maintain a substantially constant amplitude of the microwave signals supplied to directional coupler 6. In other words, an automatic gain control, or more precisely an automatic attenuation control, is provided for automatically maintaining the microwave signal level supplied to directional coupler 6 substantially constant despite variations that may occur in the signal level provided by signal generator 1 as the signal generator is tuned through a frequency range.

The modulation-frequency A. C. components of the two rectified signals have amplitudes that are respectively proportional to two mutually perpendicular vectors having a vector sum that is related to the reflection coefficient of load 3. These modulation-frequency components are transmitted through two blocking capacitors 46 and 47, which do not transmit the D. C. component of the rectified signals, to two adjustable gain-control potentiometers 48 and 49. Portions of the signals supplied to potentiometers 48 and 49 are amplified by amplifiers 50 and 51 and are then supplied to the vertical and horizontal deflection plates, respectively, of a conventional cathode-ray tube 52. To reduce the noise factor, the gain control potentiometers 48 and 49 may be placed between stages of the amplifiers 50 and 51 instead of at the amplifier inputs.

If the beam of cathode-ray tube 52 were always "on," the rectangular waveform modulation-frequency signals supplied to the vertical and horizontal deflection plates would cause the production of two luminous spots on the phosphor screen of the cathode-ray tube. For eliminating one of these spots, negative blanking pulses are supplied to the control grid of the cathode-ray tube by square-wave generator 16, amplifier 53 and capacitor 54, connected as shown. As a result, the beam of the cathode-ray tube is "on" only during intervals when the attenuation of variable attenuator 19 has its minimum value, and the beam of the cathode-ray tube is "off" when the attenuation of variable attenuator 19 has its maximum value, or vice versa.

Now only one luminous spot is provided on the phosphor screen of cathode-ray tube 52 at a distance from the center of the screen that is proportional to the magnitude of the reflection coefficient of load 3, and at an angular position on the screen that is related to the phase angle of the reflection coefficient.

A transparent Smith chart 55, best shown in Fig. 2, is placed adjacent to the face of cathode-ray tube 52 so that the position of the luminous spot on the Smith chart indicates numerical values of the resistive and reactive impedance components of the load 3, each divided by the magnitude of the image impedance $Z_0$ of waveguide section 9. If the numerical value of the reflection coefficient is required, the value of $\theta$ can be read from the Smith chart, and the value of R can be obtained by measuring the distance between the spot and the center of the screen. Alternatively, a special polar chart directly indicating values of R and $\theta$, or charts of various other types, may be substituted for the Smith chart.

The apparatus is calibrated by connecting a load of known impedance to the flanged waveguide connection 4 and then adjusting potentiometers 48 and 49, and the angular position of the Smith chart relative to the face of cathode-ray tube 52, until the position of the luminous spot as observed through the Smith chart corresponds to the known impedance value. Thereafter, any microwave load device having an unknown impedance may be connected at flanged waveguide connection 4, and the position of the luminous spot on the Smith chart will indicate its impedance and reflection coefficient. For greater sensitivity in measuring small reflection coefficients, an expanded Smith chart (the center portion drawn to a larger scale) may be used in place of the complete Smith chart. When the charts are changed, the apparatus must be recalibrated, or selector switches must be provided for changing the amplifier gain selectively to different previously-calibrated values.

When the microwave signal generator 1 is tuned over a band of frequencies, the position of the luminous spot on the phosphor screen of the cathode-ray tube will change in accordance with changes in the load impedance as a function of frequency, and will produce a luminous trace that can be observed through the Smith chart for determining the complex impedance of the load throughout the frequency range. By using a long-persistence phosphor for the screen of cathode-ray tube 52, and repetitively tuning the signal generator 1 through the desired frequency range, the entire trace can be made continuously visible for easy observation; or, if desired, the Smith chart and the trace observed therethrough can be photographed to provide a permanent record.

With this apparatus, the complex impedance characteristics of a microwave load can be quickly and simply measured over a considerable frequency range. Furthermore, the apparatus can be operated by relatively unskilled personnel. A typical luminous trace observed through the Smith chart is illustrated by a curve 56 of Fig. 2.

For a better qualitative understanding of how the apparatus operates, assume for the moment that the only phase shifts occurring in the microwave circuit are the $\pi/2$ radian differential phase shifts produced by the directional couplers. Under this assumption, the microwave signals supplied through waveguide sections 31 and 32 to the directional couplers 33 and 36 are advanced in phase by 90 degrees relative to the microwaves supplied to directional coupler 6 by signal generator 1. The signal supplied to directional coupler 33 through waveguide section 22 is advanced in phase, relative to the microwaves supplied by the signal generator to directional coupler 6, by 180 degrees plus the phase angle $\theta$ of the reflection coefficient of load 3.

Since a portion of the signal from waveguide section 22 that is transmitted to waveguide section 34 is advanced in phase by another 90 degrees relative to the signal supplied through waveguide section 31, the two components of the sum signal in waveguide section 34 are either in phase or in phase opposition when the phase angle $\theta$ of the reflection coefficient of load 3 is 0° or 180°, and are in phase quadrature when $\theta$ is 90° or 270°. The sum signal is the vector sum of these two components. Furthermore, it will be noted that the reflected component of the sum signal in waveguide section 34 has been attenuated by the directional couplers by about 16 db relative to the incident signal component of the same sum signal, so that the reflected signal component is very small relative to the incident signal component. Under such circumstances, the only component of the reflected signal that substantially influences the amplitude of the microwave sum signal is the signal component that is either in phase with or in phase opposition to the signal supplied through waveguide section 31. Consequently, the rectified signal supplied to transmission line 40 by square-law detector 39 has a D. C. component that is proportional to the square of the amplitude of the microwave signal supplied through waveguide section 31, and has a modulation-frequency A. C. component that is proportional in amplitude to the product of the D. C. component times the value of $R \cos \theta$.

With respect to the microwave sum signal supplied to waveguide section 37, the reflected signal component has been advanced 180 degrees in phase by the directional couplers, so that the incident signal and reflected signal components are either in phase or in phase opposition when the reflection coefficient phase angle $\theta$ of load 3 is 90° or 270°, and are in phase quadrature when the angle $\theta$ is 0° or 180°. Consequently, the modulation-frequency component of the rectified signal supplied to line 42 by square-law detector 41 is proportional to the product of the D. C. component times the value of $R \sin \theta$.

As hereinbefore explained, the modulation-frequency component of the signal in line 40 is supplied to the vertical deflection plates of cathode-ray tube 52, so that the luminous spot is deflected in a vertical direction on the phosphor screen of the cathode-ray tube by an amount proportional to $-R \cos \theta$. The modulation-frequency component of the signal in line 42 is supplied to the horizontal deflection plates of cathode-ray tube 52, so that the luminous spot is deflected in a horizontal direction by an amount proportional to $R \sin \theta$. The total deflection of the luminous spot from the center of the phosphor screen is the vector sum of the vertical and horizontal deflections, so that the distance of the spot from the center of the screen is proportional to the magnitude R of the reflection coefficient, and the angular position of the spot of the screen is proportional to the phase angle $\theta$ of the reflection coefficient. When the luminous spot is observed through the transparent Smith chart, the position of the spot on the Smith chart shows the value of the complex impedance of load 3.

For a better quantitative understanding of how the apparatus operates, a simplified mathematical analysis is helpful. Still neglecting all phase shifts in the microwave circuit except the 90 degree differential phase shifts produced by the directional couplers and the phase angle $\theta$ of the reflection coefficient of load 3, let $e_S$ represent the voltage vector of the microwaves supplied to directional coupler 6 from signal generator 1, $e_D$ represent the voltage vector of microwaves transmitted to load device 3, $e_R$ represent the voltage vector of microwaves reflected from load device 3, $e_A$ represent the voltage vector of the microwave sum signal supplied to waveguide section 37, and $e_B$ represent the voltage vector of the microwave sum signal supplied to waveguide section 34.

The microwave sum signal in waveguide section 37 consists of two components, one of which is proportional to $e_S$ and is herein represented by vector $e_{AS}$, and the other of which is proportional to $e_R$ and is herein represented by the vector $e_{AR}$. Consequently, $e_A = e_{AS} + e_{AR}$. Similarly, $e_B = e_{BS} + e_{BR}$, where $e_{BS}$ and $e_{BR}$ are the two components of $e_B$ that are proportional to $e_S$ and $e_R$, respectively. Further, let the corresponding capital letters $E_S$, $E_D$, etc. represent the magnitude of the aforesaid voltage vectors.

The reflection coefficient of load 3 is equal to the vector ratio $e_R/e_D$ which may be represented by the complex number $R \cos \theta + jR \sin \theta$, where R represents the magnitude $E_R/E_D$ of the reflection coefficient and $\theta$ represents the phase angle of the reflection coefficient. The mathematical operator $j$, which is numerically equal to $\sqrt{-1}$, represents a vector rotation of 90 degrees, as is conventional in vector algebra. Further, let the transmission coefficient $T_S = E_{AS}/E_S = E_{BS}/E_S$, and let the transmission coefficient $T_Rf(t) = E_{AR}/RE_S = E_{BR}/RE_S$.

The function $f(t)$ represents the amplitude modulation produced by variable attenuator 19 when rectangular waveform current pulses are supplied to its winding 18 in the manner hereinbefore described. Assuming that the modulation envelope has a rectangular waveform with a duty cycle of one-half (current pulses in winding 18 having a duration equal to the "off" interval between pulses) and a modulation index $m$, the function $f(t) = \frac{1}{2}(1 \pm m)$, where $\pm$ indicates that the sign preceding $m$ changes from $+$ to $-$ alternately at the fundamental frequency of modulation.

By vector addition of the signals supplied to waveguide section 37 it can easily be shown that $$-e_A/e_S = T_R f(t) R \cos \theta - j[T_S - T_R f(t) R \sin \theta]$$

Since $T_R$ is very much smaller than $T_S$, as hereinbefore explained, $$E^2_A \approx T^2_S E^2_S \mp T_S T_R m E^2_S R \sin \theta$$

In this expression the $\mp$ sign indicates that the last term represents a modulation-frequency A. C. component having negative and positive values alternating with each other at the fundamental modulation frequency.

Since the square-law detector 41 supplies to line 42 a rectified voltage proportional to $E^2_A$, the D. C. component of the voltage supplied to the transmission line 42 is proportional to $T^2_S E^2_S$, and this D. C. component, together with an identical D. C. component supplied to transmission line 40, is supplied to the automatic gain control circuit for maintaining the value of $E_S$ constant, as hereinbefore explained.

Furthermore, when the current pulses supplied to winding 18 are of sufficient magnitude to produce 90° rotation of the electromagnetic waves by the ferrite element of variable attenuator 19, the modulation index $m$ is a constant substantially equal to 1. $T_S$ and $T_R$ are constants of the microwave circuit, depending chiefly upon the attenuation produced by signal division in the directional couplers. Consequently, the alternating voltage supplied to the horizontal deflection plates of cathode-ray tube 52 is proportional to $\mp R \sin \theta$. Since the electron beam of the cathode-ray tube is cut off during one polarity of this alternating voltage (during the positive polarity, for example) the horizontal deflection of the luminous spot on the phosphor screen of the cathode-ray tube is proportional to $R \sin \theta$.

In a similar manner it can be shown that $$e_B/e_S = T_R f(t) R \sin \theta + j[T_S - T_R f(t) R \cos \theta]$$

and that $$E^2_B \approx T^2_S E^2_S \mp T_S T_R m E^2_S R \cos \theta$$

Consequently, the vertical deflection of the luminous spot on the phosphor screen of the cathode-ray tube is proportional to $-R \cos \theta$.

Since the total deflection of the luminous spot is the vector sum of the horizontal and vertical deflections, the distance of the luminous spot from the center of the phosphor screen is proportional to $R$, and the angular position of the spot on the screen is proportional to $\theta$. In other words, the position of the luminous spot upon the screen of cathode-ray tube 52 directly represents the reflection coefficient of load 3, and the position of the luminous spot in relation to Smith chart 55 indicates the complex impedance of load 3.

It is not essential that the detectors have a square-law characteristic. In general, since $T_S \gg T_R$, the two rectified signals can be represented by the expression $$E_A \approx T_S^n E_S^n \mp \frac{1}{2} m n T_R T_S^{n-1} E_S^n R \sin \theta$$

and $$E_B \approx T_S^n E_S^n \mp \frac{1}{2} m n T_R T_S^{n-1} E_S^n R \cos \theta$$

where the exponent $n$ represents the detector characteristic. For example, for linear detectors $n=1$, for square-law detectors $n=2$, etc.

Thus far in the analysis it has been assumed that the only phase shifts in the microwave circuit are the differential phase shifts produced by the directional couplers and the phase angle $\theta$ of the reflection coefficient of load 3. This assumption is useful for explaining the operation of the apparatus in a simple manner, but in actual practice it is not true since there are other phase shifts in the microwave circuit. These other phase shifts are of two general types: those that vary as a function of the microwave frequency; and those that are independent of the microwave frequency.

For example, there is a frequency-dependent phase shift in each waveguide section that is proportional to the length of that section. Frequency-dependent phase shifts produced by the other microwave components, such as the directional couplers, are equivalent to the frequency-dependent phase shifts that would be produced by an equivalent length of waveguide. Accordingly, for the purpose of analyzing the frequency-dependent phase shifts, it is convenient to assume that the frequency-dependent phase shift produced by any microwave component other than a waveguide, such as the frequency-dependent phase shift in one of the directional couplers, is actually produced by an additional length of waveguide connected in series with the microwave element in which the frequency-dependent phase shift actually occurs.

For better accuracy, one-half of the equivalent waveguide length is assumed to be added on each side of the directional coupler or other microwave circuit element. For example, in the following discussion it will be assumed that the length of waveguide section 7 has been increased by an amount that will produce a frequency-dependent phase shift equivalent to one-half the frequency-dependent phase shift of directional coupler 6 and one-half the frequency-dependent phase shift of directional coupler 8, and that the other waveguide sections have been increased in length in a similar manner so that all of the frequency-dependent phase shifts are represented by the waveguide sections alone.

For the apparatus to operate accurately over a wide range of frequencies, the frequency-dependent phase shift of the microwave voltage vector $e_{AS}$ must be identically equal to the frequency-dependent phase shift of the microwave voltage vector $e_{AR}$; and the frequency-dependent phase shift of the microwave voltage vector $e_{BS}$ must be identically equal to the frequency-dependent phase shift of the microwave voltage vector $e_{BR}$. These requirements place two restrictions on the design of the microwave circuit.

The first restriction is that the electrical length of waveguide section 23 plus the electrical length of waveguide section 31 must be equal to the electrical length of waveguide section 22 plus the electrical length of waveguide section 32. A convenient way to satisfy this restriction is to make all four of the waveguide sections 22, 23, 31 and 32 of equal length.

The second restriction, assuming that the load impedance is to be measured at flanged waveguide connection 4, is that the sum of the electrical lengths of waveguide sections 12, 25, 26, 27 and 31 must be equal to the sum of the electrical lengths of waveguide sections 7, 15, 20 and 22 plus twice the electrical length of waveguide section 9, taking into account the increased length of each waveguide section needed to provide frequency-dependent phase shifts equivalent to the frequency dependent phase shifts occurring in adjacent circuit elements such as directional couplers.

In some cases it may be desirable to measure the load impedance at some point other than connection 4. For example, it may be convenient to connect another section of waveguide between the load and waveguide section 9, or the load itself may include a long waveguide wherein an impedance measurement at the opposite end, or at some intermediate location, is desired. In any of these cases, movement of the point at which impedance is to be measured away from connection 4 is equivalent to an increase in the length of waveguide section 9, which must be compensated by a change in length of one or more of the other waveguide sections. For this reason, waveguide section 26 preferably is made as a removable U-shaped section, as shown, so that it can be replaced whenever desired by other U-shaped waveguide sections of different lengths, or section 26 may be a "line-stretcher" element that is equivalent to a waveguide section of continuously adjustable length, so that the point at which the load impedance is measured can be shifted any desired distance away from connection 4.

When the lengths of the different waveguide sections are chosen to meet the aforesaid two restrictions, the reflection coefficient and impedance measurements made with this apparatus are independent of frequency over a wide frequency range. Consequently, no correction of the measured values is needed to compensate for changes in the signal generator frequency.

In addition to the phase shifts hereinbefore discussed, there are other phase shifts, chiefly in the directional couplers, that are independent of frequency. Consider directional coupler 8, for example. Heretofore it has been assumed that the microwaves transmitted straight through the directional coupler are not shifted in phase, while microwaves transmitted diagonally through the directional coupler are advanced in phase by 90 degrees. Actually, the microwaves transmitted straight through the directional coupler are retarded in phase by phase angle $\beta$, while microwaves transmitted diagonally through the directional coupler are advanced in phase by an angle $\pi/2-\beta$, so that the differential phase shift is $\pi/2$ radians or 90 degrees.

In the case of a —3 db coupler, as herein described, the phase angle $\beta$ is $\pi/4$ radians or 45 degrees, so that in the case of the apparatus illustrated the microwaves transmitted straight through directional coupler 8 are retarded in phase by 45 degrees, while the microwaves transmitted diagonally through directional coupler 8 are advanced in phase by 45 degrees. These phase shifts, which are substantially independent of frequency, are in addition to the frequency-dependent phase shifts that were taken into account in considering the effective lengths of the adjacent waveguide sections.

In the apparatus herein illustrated and described, the only ones of the frequency-independent phase shifts that are of practical significance are the phase shift $\beta_8$ in directional coupler 8 and the phase shift $\beta_{21}$ in directional coupler 21. The effect of these phase shifts is to produce a difference between the value of $\theta$ represented by the luminous spot on the face of cathode-ray tube 52 and the true value of $\theta$ which difference is numerically equal to $2\beta_8+\beta_{21}$. The difference or "error" is easily corrected simply by rotating Smith chart 55 relative to cathode-ray tube 52 through an angle equal to $2\beta_8+\beta_{21}$. Where directional couplers 8 and 21 are both —3 db couplers, as herein described, $\beta_8$ and $\beta_{21}$ both have values of $\pi/4$ radians or 45 degrees. Consequently, $2\beta_8+\beta_{21}$ is equal to 135 degrees, and the error is corrected by rotating Smith chart 55 by 135 degrees relative to cathode-ray tube 52.

Various modifications in the apparatus illustrated and described can be made without departing from the broader inventive principles herein disclosed. It is evident that directional coupler 21 and T 30 may be interchanged without producing any fundamental change in the operating principles of the apparatus, although an additional rotation of the Smith chart 55 relative to the cathode-ray tube 52 may be required. Furthermore, various changes in the arrangement, design, and coupling coefficients of the directional couplers may be made, provided $e_{AR}$ and $e_{BR}$ have small amplitudes compared to $e_{AS}$ and $e_{BS}$, and further provided that the phase relation of $e_{AR}$ to $e_{AS}$ differs by 90 degrees from the phase relation of $e_{BR}$ to $e_{BS}$.

In many cases the dummy attenuator 24 can be eliminated without any disadvantageous consequences. Variable attenuator 5 and its associated circuits may be omitted if other means are provided for maintaining $E_S$ constant. For use at lower frequencies where the waveguides might become inconveniently bulky, other transmission means such as strip lines may be used in place of waveguides. Various modifications in the display apparatus, such as the substitution of an X—Y recorder in place of the cathode-ray tube, will occur to those skilled in the art.

A single directional coupler might be employed to supply both of the two signals respectively proportional to the microwaves transmitted to the load and the microwaves reflected from the load—for example, waveguide section 12 could be coupled to the fourth arm of directional coupler 8 in place of attenuator 14—but the arrangement shown is advantageous for minimizing undesirable reflections and preventing detrimental coupling between the two microwave circuit branches.

Modulation of the reflected microwave signal with a modulation waveform that is not rectangular is possible at the expense of certain complications in the low-frequency circuit, generally involving the use of synchronous detectors. Thus rectangular waveform modulation, although not absolutely essential to the broader inventive principles herein disclosed, aids in the achievement of a reliable and simple detection circuit.

With obvious minor modifications, the apparatus herein described can be used to measure complex transmission coefficients instead of or as well as complex reflection coefficients. For measuring transmission coefficients, directional coupling means would be provided for supplying to waveguide section 12 a microwave signal proportional to the microwaves supplied to the device under test, as in the apparatus illustrated, but waveguide section 15 would be connected to receive a microwave signal proportional to the microwaves transmitted through the device under test to its output terminals.

From the foregoing it will be understood that this invention in its broader aspects is not limited to the specific embodiment herein illustrated and described, and that the following claims are intended to cover all changes and modifications that do not depart from the true spirit and scope of the invention.

What is claimed is:

1. Apparatus for measuring characteristics of an electromagnetic wave load, comprising means for transmitting electromagnetic waves to said load, means for providing a first electromagnetic wave signal proportional to electromagnetic waves transmitted to said load and a second electromagnetic wave signal proportional to electromagnetic waves reflected from said load, means for dividing said first signal into first and second portions, means for amplitude modulating said second signal, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two detectors connected to rectify said two sum signals separately and to provide two rectified signals each having a modulation-frequency component, and means for displaying the vector sum of two perpendicular vectors having magnitudes that are respectively proportional to the amplitudes of said modulation-frequency components.

2. Apparatus for measuring the reflection coefficient of an electromagnetic wave load, comprising a source of substantially constant-amplitude variable-frequency electromagnetic waves, an electromagnetic wave transmission circuit connected between said source and the load, said transmission circuit transmitting electromagnetic waves in a forward direction from said source to said load and transmitting in a backward direction electromagnetic waves reflected by said load, directional coupling means connected to said transmission circuit for providing a first electromagnetic wave signal proportional to said electromagnetic waves transmitted in the forward direction and a second electromagnetic wave signal proportional to said electromagnetic waves transmitted in the reverse direction, means for dividing said first signal into first and second portions, means for amplitude modulating said second signal with a substantially rectangular waveform modulation envelope, means for dividing said amplitude-modulated second signal into first and second portions with a phase relation between two said first portions that differs from the phase relation between said two second portions by substantially 90 degrees, means for vectorially adding parts of said two first portions to form a first sum signal, means for vectorially adding parts of said two second portions to form a second sum signal, two detectors connected to rectify said two sum signals separately and to provide two rectified signals each having a modulation-frequency component, and means for displaying the vector sum of two perpendicular vectors having magnitudes that are respectively proportional to the amplitudes of said modulation-frequency components.

3. Apparatus for measuring the reflection coefficient of an electromagnetic wave load, comprising a waveguide transmitting in opposite directions electromagnetic waves supplied to the load and microwaves reflected by the load, a first directional coupler connected to said waveguide for providing a first electromagnetic wave signal proportional to said supplied electromagnetic waves, a second directional coupler connected to said waveguide for providing a second electromagnetic signal proportional to said reflected electromagnetic waves, a variable attenuator of the Faraday rotation type connected to said second coupler for attenuating said second signal, said attenuator having a winding for receiving electric current to control the attenuation of said second signal, means for supplying substantially rectangular waveform periodic current pulses to said winding so that said second signal is amplitude modulated with a substantially rectangular waveform modulation envelope, means for dividing said first signal into first and second portions, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two detectors connected to rectify said two sum signals separately and to provide two rectified signals each having a modulation-frequency component, and means for displaying the vector sum of two perpendicular vectors having magnitudes that are respectively proportional to the amplitudes of said modulation-frequency components.

4. Apparatus for measuring the reflection coefficient of an electromagnetic wave load, comprising a waveguide transmitting in opposite directions electromagnetic waves supplied to said load and electromagnetic waves reflected by said load, directional coupling means for providing a first electromagnetic wave signal proportional to said supplied electromagnetic waves and a second electromagnetic wave signal proportional to said reflected electromagnetic waves, means for amplitude modulating said second signal, a directional coupler connected to divide one of said signals into first and second portions in phase quadrature, a T junction connected to divide the other of said signals into first and second portions, a directional coupler connected for vectorially adding parts of said two first portions to provide a first sum wave signal, a directional coupler connected for vectorially adding parts of said two second portions to provide a second sum wave signal, two detectors connected to rectify said two sum signals separately and to provide two rectified signals each having a modulation-frequency component, and means for displaying the vector sum of two perpendicular vectors having magnitudes that are respectively proportional to the amplitudes of said modulation-frequency components.

5. Apparatus for measuring the reflection coefficient of an electromagnetic wave load, comprising five directional couplers each having two opposite pairs of circuit arms, each of said couplers being adapted to divide electromagnetic waves supplied to any one of its circuit arms into two portions in phase quadrature that are transmitted to respective circuit arms of the opposite pair, a first waveguide connection and an attenuator connected to respective circuit arms of one pair in a first of said couplers, first and second waveguide sections connected to respective circuit arms of the other pair in said first coupler, a third waveguide section, said first and third sections being connected to respective circuit arms of one pair in a second of said couplers, a second waveguide connection and an attenuator connected to respective circuit arms of the other pair in said second coupler, said first waveguide connection being adapted for connection to an electromagnetic wave source and said second waveguide connection being adapted for connection to a load, whereby electromagnetic waves from the source are partly transmitted through said first and second couplers and said first waveguide section to the load, are partly transmitted through said first coupler to said second waveguide section for providing a first electromagnetic wave signal proportional to the electromagnetic waves supplied to the load, and are partly dissipated in the attenuator connected to said second coupler, while electromagnetic waves reflected by the load are partly transmitted through said second coupler to said third waveguide section for providing a second electromagnetic wave signal proportional to the reflected electromagnetic waves and are partly dissipated in the attenuator connected to said first coupler, a variable attenuator of the Faraday rotation type connected between said third waveguide section and a fourth waveguide section for attenuating said second electromagnetic wave signal, said variable attenuator having a winding to receive a current for controlling the attenuation of said second signal, means for supplying a periodic current to said winding for amplitude modulating said second signal, one of said second and fourth waveguide sections and an attenuator being connected to respective circuit arms of one pair in a third of said couplers, a waveguide T having a common circuit arm and two branch circuit arms, said T being adapted to divide electromagnetic waves supplied to its common arm into two in-phase portions that are transmitted to respective ones of its branch arms, said common arm being connected to the other of said second and fourth waveguide section, whereby said third coupler and said T divide each of said first and second electromagnetic wave signals into first and second portions, the phase relation between said two first portions of the divided electromagnetic wave signals differing from the phase relation between said two second portions of the divided electromagnetic wave signals by substantially 90 degrees, fifth and sixth waveguide sections connected to respective circuit arms of the other pair in said third coupler, seventh and eighth waveguide sections connected to respective ones of the two branch circuit arms of said T, said fifth and seventh sections being connected to respective circuit arms of a pair in a fourth of said couplers, said sixth and eighth sections being connected to respective circuit arms of a pair in a fifth of said couplers, a ninth waveguide section and an attenuator connected to respective circuit arms of the other pair in said fourth coupler, a tenth waveguide section and an attenuator connected to respective circuit arms of the other pair in said fifth coupler, whereby parts of said two first portions of the divided electromagnetic wave signals are vectorially added to provide a first sum electromagnetic wave signal in said ninth waveguide section while parts of said two second portions of the divided electromagnetic wave signals are vectorially added to provide a second sum signal in said tenth waveguide section, two detectors connected to respective ones of said ninth and tenth waveguide sections for rectifying said two sum signals separately and providing two rectified signals each having a modulation-frequency component, and means for displaying the vector sum of two perpendicular vectors having magnitudes that are respectively proportional to the amplitudes of said modulation-frequency components.

6. Apparatus as defined in claim 5, wherein said current consists of periodic pulses of substantially rectangular waveform so that said second electromagnetic wave signal is amplitude modulated with a substantially rectangular waveform modulation envelope.

7. Apparatus as defined in claim 5, wherein the sum of the electrical lengths of said fifth and eighth waveguide sections is equal to the sum of the electrical lengths of said sixth and seventh waveguide sections.

8. Apparatus as defined in claim 5, wherein the sum of the electrical lengths of said second and eighth waveguide sections is equal to the sum of the electrical lengths of said first, third, fourth and sixth waveguide sections plus twice the electrical distance of the load from said second directional coupler.

9. Apparatus as defined in claim 8, wherein said second waveguide section includes a removable portion that can be replaced by similar portions of different lengths, so that reflection coefficients can be measured at different distances from said second coupler.

10. Apparatus as defined in claim 9, wherein said removable portion is a U-shaped length of waveguide.

11. Apparatus as defined in claim 5, wherein the transmittance of the electromagnetic wave circuit for transmitting portions of the reflected electromagnetic waves to said ninth and tenth waveguide sections is much smaller than the transmittance of the electromagnetic wave circuit for transmitting portions of the supplied electromagnetic waves to said ninth and tenth waveguide sections, whereby the reflected signal components of said sum signals are much smaller than the other components of said sum signals.

12. Apparatus for measuring the reflection coefficient of an electromagnetic wave load, comprising means for transmitting electromagnetic waves to the load, said load reflecting a portion of said electromagnetic waves depending upon the value of said reflection coefficient, directional coupling means for providing a first electromagnetic wave signal proportional to the electromagnetic waves transmitted to said load and a second electromagnetic wave signal proportional to the electromagnetic waves reflected by said load, means for dividing said first signal into first and second portions, means for amplitude modulating said second signal, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two detectors connected to rectify said two sum signals separately and to provide two rectified signals each having a D. C. component and a modulation-frequency A. C. component, said D. C. components being related in value to the amplitude of the electromagnetic waves transmitted to the load, an automatic control circuit controlled by said D. C. components for maintaining said amplitude of the electromagnetic waves transmitted to the load substantially constant, and means for displaying the vector sum of two perpendicular vectors having magnitudes that are respectively proportional to the amplitudes of said modulation-frequency components.

13. Apparatus for measuring the reflection coefficient of an electromagnetic wave load, comprising an input connection for receiving electromagnetic waves, an electromagnetic wave transmission circuit for transmitting a portion of said electromagnetic waves to a load, a variable attenuator connected between said input connection and said transmission circuit, said transmission circuit transmitting electromagnetic waves in a forward direction to said load and transmitting in a backward direction electromagnetic waves reflected by said load, directional coupling means connected to said transmission circuit for providing a first electromagnetic wave signal proportional to said microwaves transmitted in the forward direction and a second electromagnetic wave signal proportional to said electromagnetic waves transmitted in the backward direction, means for dividing said first signal into first and second portions, means for amplitude modulating said second signal, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two square-law detectors connected to rectify said two sum signals separately and to provide two rectified signals each having D. C. components and modulation-frequency A. C. components, said D. C. components being related in value to the amplitudes of the electromagnetic waves transmitted to the load, means controlled by said D. C. components for automatically regulating said variable attenuator to maintain the amplitude of the electromagnetic waves supplied to the load substantially constant, and means for displaying the vector sum of two perpendicular vectors having magnitudes that are respectively proportional to the amplitudes of said modulation-frequency components.

14. Apparatus as defined in claim 13, wherein said variable attenuator is of the Farady rotation type having a winding for receiving a current to control the attenuation of the electromagnetic waves, and said current is supplied by an amplifier responsive to the magnitude of said D. C. components.

15. Apparatus for measuring the impedance of an electromagnetic wave load, comprising means for transmitting electromagnetic waves to the load, said load reflecting a portion of said electromagnetic waves depending upon the value of its impedance, directional coupling means for providing a first electromagnetic wave signal proportional to the electromagnetic waves transmitted to said load and a second electromagnetic wave signal proportional to the electromagnetic waves reflected by said load, means for dividing said first signal into first and second portions, means for amplitude modulating said second signal, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two detectors connected to rectify said two sum signals separately and to provide two rectified signals each having modulation-frequency components, a cathode-ray tube having a face for displaying a luminous spot and two deflection circuits for deflecting said spot in two mutually perpendicular directions, means for supplying to respective ones of said deflection circuits deflection signals proportional to the modulation-frequency components of said two rectified signals, and a transparent Smith chart adjacent to said face.

16. Apparatus for measuring the impedance of an electromagnetic wave load, comprising a source of substantially constant-amplitude variable-frequency electromagnetic waves, an electromagnetic wave transmission circuit connected between said source and the load, said transmission circuit transmitting electromagnetic waves in a forward direction from said source to said load and transmitting in a backward direction electromagnetic waves reflected by said load, directional coupling means connected to said transmission circuit for providing a first electromagnetic wave signal proportional to said electromagnetic waves transmitted in the forward direction and a second electromagnetic wave signal proportional to said electromagnetic waves transmitted in the reverse direction, means for dividing said first signal into first and second portions, means for amplitude-modulating said second signal with a substantially rectangular waveform modulation envelope, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two detectors connected to rectifying said two sum signals separately and to provide two rectified signals each having modulating-frequency components, a cathode-ray tube having a phosphor screen, means for providing an electron beam to produce a luminous spot on said screen, a control grid for varying the intensity of said beam, two deflection circuits for deflecting said beam to move said spot in two mutually perpendicular directions, means for supplying to respective ones of said deflection circuits deflection signals proportional to the modulation-frequency components of said two rectified signals, means for supplying a blanking signal synchronized with said amplitude modulation to said control grid for interrupting said beam and blanking said spot during a portion of each modulation cycle, and a transparent Smith chart optically alined with said screen so that said spot can be viewed through said chart.

17. Apparatus for measuring characteristics of an electromagnetic load, comprising means for transmitting electromagnetic waves to said load, means for providing a first electromagnetic wave signal proportional to electromagnetic waves transmitted to said load and a second electromagnetic wave signal proportional to electromagnetic waves leaving said load, means for dividing said first signal into first and second portions, means for amplitude modulating said second signal, means for dividing said amplitude-modulated second signal into first and second portions with a phase relation between said two first portions that differs from the phase relation between said two second portions by substantially 90 degrees, means for vectorially adding parts of said two first portions to form a first sum signal, means for vectorially adding parts of said two second portions to form a second sum signal, two detectors connected to rectify said two sum signals separately and to provide two rectified signals each having a D. C. component and a modulation-frequency A. C. component, said D. C. components being related in value to the amplitude of the electromagnetic waves transmitted to the load, an automatic control circuit controlled by said D. C. components for maintaining said amplitude of the electromagnetic waves transmitted to the load substantially constant, and means for displaying the vector sum of two perpendicular vectors having magnitudes that are respectively proportional to the amplitudes of said modulation-frequency components.

References Cited in the file of this patent
UNITED STATES PATENTS

| | | |
|---|---|---|
| 2,746,014 | Fox | May 15, 1956 |
| 2,756,387 | Barnett | July 24, 1956 |
| 2,790,143 | Kyhl | Apr. 23, 1957 |

UNITED STATES PATENT OFFICE
CERTIFICATE OF CORRECTION

Patent No. 2,876,416                        March 3, 1959

Jorgen P. Vinding

It is hereby certified that error appears in the printed specification of the above numbered patent requiring correction and that the said Letters Patent should read as corrected below.

Column 1, line 55, for "measurments" read -- measurements --; column 3, line 65, for "Microwave" read -- Microwaves --; column 5, line 32, for "miroowave" read -- microwave --; line 68, for "rectified" read -- rectifier column 13, line 29, for "microwaves" read -- electromagnetic waves --; line 34, before "signal" insert -- wave --; column 15, line 52, for "valve" read -- value --; column 16, line 60, strike out "a" before the word "signal"; column 17, line 28, for "rectifying" read -- rectify --.

Signed and sealed this 7th day of July 1959.

(SEAL)

Attest:

KARL H. AXLINE
Attesting Officer

ROBERT C. WAT(S)
Commissioner of Pat(ents)